United States Patent
Roy et al.

(10) Patent No.: US 7,376,398 B2
(45) Date of Patent: May 20, 2008

(54) IMPLEMENTING A SMART ANTENNA IN WIRELESS LOCAL AREA NETWORK

(75) Inventors: Vincent Roy, Montreal (CA); Paul Marinier, Brossard (CA); Arty Chandra, Manhasset Hills, NY (US); Inhyok Cha, Melbourne, FL (US)

(73) Assignee: InterDigital Technology Corporation, Wilmington, DE (US)

( * ) Notice: Subject to any disclaimer, the term of this patent is extended or adjusted under 35 U.S.C. 154(b) by 524 days.

(21) Appl. No.: 11/018,794

(22) Filed: Dec. 21, 2004

(65) Prior Publication Data

US 2006/0057964 A1 Mar. 16, 2006

Related U.S. Application Data

(60) Provisional application No. 60/608,758, filed on Sep. 10, 2004.

(51) Int. Cl.
H04B 1/26 (2006.01)
(52) U.S. Cl. .................. 455/101; 455/562.1; 455/277.1
(58) Field of Classification Search .................... None
See application file for complete search history.

(56) References Cited

U.S. PATENT DOCUMENTS 7,206,610 B2 * 4/2007 Iacono et al. ............. 455/562.1
7,236,759 B2 * 6/2007 Cha et al. ................... 455/275

OTHER PUBLICATIONS

IEEE Wireless LAN Edition, A Compilation Based On IEEE Std. 802.11™-1999 (R2003) and its amendments, pp. 1-678.

IEEE Standard for Information Technology—Telecommunications and Information Exchange Between Systems—Local and Metropolitan Area Networks—Specific Requirements, Part 11: Wireless Medium Access Control (MAC) and Physical Layer (PHY) Specifications: Amendment 7: Medium Access Control (MAC) Quality of Service (QoS) Enhancements, Aug. 2004.

IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 5: Spectrum and Transmit Power Management Extensions in the 5GHz Band in Europe, Oct. 2003.

Draft Amendment to Standard For Telecommunications and Information Exchange Between Systems—LAN/MAN Specific Requirements—Part 11: Wireless Medium Access Control (MAC) and Physical Layer (PHY) Specifications: Amendment 7: Radio Resource Measurement, Jul. 2004.

* cited by examiner

Primary Examiner—Thanh Cong Le
(74) Attorney, Agent, or Firm—Volpe and Koenig, P.C.

(57) ABSTRACT

A method for implementing a smart antenna in establishing association between a station (STA) and an access point (AP) in a wireless local area network begins by transmitting a beacon frame by the AP on one antenna beam. The beacon frame is received at the STA, which measures the signal quality of the beacon frame. The AP switches to a different antenna beam and repeats the method until the beacon frame has been transmitted on all antenna beams. The STA associates to the AP that transmits the beacon frame with the highest signal quality on one of its antenna beams. A similar method may be used in which the STA sends a probe request frame to the AP, which then responds with probe response frames sent on multiple antenna beams.

12 Claims, 4 Drawing Sheets

FIG. 2

| FRAME CONTROL | DURATION | DA | SA | BSSID | SEQUENCE CONTROL | TIME-STAMP FIELD | BEACON INFORMATION FIELD | CAPABILITY INFORMATION FIELD | SSID IE | SUPPORTED RATES IE | FH/DS PARAMETER SET IE | CF PARAMETER SET IE (OPTIONAL) | IBSS PARAMETER SET IE (OPTIONAL) | TIME (OPTIONAL) | TOTAL NUMBER OF BEAMS | CURRENT BEAM IDENTIFIER |

| FRAME CONTROL | DURATION | DA | SA | BSSID | SEQUENCE CONTROL | SSID IE | SUPPORTED RATES IE | SCAN ALL BEAMS? |

| FRAME CONTROL | DURATION | DA | SA | BSSID | SEQUENCE CONTROL | TIME-STAMP FIELD | BEACON INFORMATION FIELD | CAPABILITY INFORMATION FIELD | SSID IE | SUPPORTED RATES IE | FH/DS PARAMETER SET IE | CF PARAMETER SET IE (OPTIONAL) | IBSS PARAMETER SET IE (OPTIONAL) | TOTAL NUMBER OF BEAMS | CURRENT BEAM IDENTIFIER |

600 / 602 / 604 / 606 / 608 / 610 / 612 / 614 / 616 / 618 / 620 / 622 / 624 / 626 / 628 / 630 / 632

IMPLEMENTING A SMART ANTENNA IN WIRELESS LOCAL AREA NETWORK

CROSS REFERENCE TO RELATED APPLICATION

This application claims the benefit of U.S. Provisional Application No. 60/608,758, filed Sep. 10, 2004, which is incorporated by reference as if fully set forth herein.

FIELD OF INVENTION

The present invention generally relates to wireless local area networks, and more particularly, to a method and apparatus for implementing a smart antenna in establishing an association between an access point (AP) and a station (STA).

BACKGROUND

In a wireless local area network (WLAN) operating in infrastructure mode, a STA typically performs scanning in order to estimate which AP is the best candidate to serve it. Scanning performed by the STA can be passive or active. In passive scanning, the STA listens for beacon frames sent by the APs. In active scanning, the STA sends out probe requests and the APs respond by sending a probe response to the STA.

In order to enhance coverage and increase throughput, APs can be equipped with advanced antenna structures, which allow them to change the radiation pattern (the beam) they use. This is a function of the position of the STA to which the AP sends packets and/or of the time-varying channel. Because the beacon frames are not aimed at a particular STA, but rather at a multitude of STAs, they tend to be sent uniformly across all directions (i.e., with an omni-directional beam). Similarly, because it is desirable for an AP to hear the packets from all its associated STAs, the AP typically listens to the channel using an omni-directional beam. This type of beam does not necessarily allow the AP to determine which beam is the best to serve a STA, even after it has received a probe request from the STA. Therefore, a probe response also tends to be transmitted using an omni-directional beam.

A STA uses the beacons (passive scanning) and the probe requests (active scanning) to estimate, among other things, the quality of the radio links (e.g., signal to noise ratio (SNR)) that it could obtain from the different APs. Beacons and probe responses are typically sent by the APs using an omni-directional beam for the reasons described above. This creates a situation where a STA may estimate, based on the received signal quality it perceives from the beacons and/or probe responses, that a given AP is the best candidate, when in fact this AP will perform worse than another AP for the transmission of traffic frames which can be sent with directional beams.

FIG. 1 shows an exemplary WLAN 100 including a STA 102 and two APs, AP_A 110 and AP_B 120. AP_A 110 can utilize an omni-directional beam 112 and a plurality of directional beams 114, 116, 118. AP_B 120 can utilize an omni-directional beam 122 and a plurality of directional beams 124, 126, 128.

The STA 102 measures the received power of the various beams as shown in Table 1.

TABLE 1

Measured Received Signal Power at STA 102

| Signal from | On beam number | Beam type | Received power at STA 102 |
|---|---|---|---|
| AP_A | 112 | omni | −75 dBm |
| AP_A | 116 | directional | −85 dBm |
| AP_A | 118 | directional | −85 dBm |
| AP_B | 122 | omni | −80 dBm |
| AP_B | 124 | directional | −70 dBm |

The STA 102 can receive stronger beacons and/or probe responses via omni-directional beam 112 from AP_A 110 than via omni-directional beam 122 from AP_B 120. However, AP_B 120 would be a better candidate than AP_A 110 for transmitting traffic frames, since AP_B 120 is in a better position to make use of its advanced antenna structure and focus the energy towards the STA 102 (via directional beam 124).

SUMMARY

A method for implementing a smart antenna in establishing association between a STA and an AP in a WLAN begins by transmitting a beacon frame by the AP on one antenna beam. The beacon frame is received at the STA, which measures the signal quality of the beacon frame. The AP switches to a different antenna beam and repeats the method until the beacon frame has been transmitted on all antenna beams. The STA associates to the AP that transmits the beacon frame with the highest signal quality on one of its antenna beams. A similar method may be used in which the STA sends a probe request frame to the AP, which then responds with probe response frames sent on multiple antenna beams.

A system for implementing a smart antenna in establishing association between a STA and an AP in a WLAN includes a beacon frame sent from the AP to the STA. The beacon frame includes a field to identify a total number of antenna beams on which a transmission will be made and a field to identify the beam that is currently being transmitted on.

Another system for implementing a smart antenna in establishing association between a STA and an AP in a WLAN includes a probe request frame sent from the STA to the AP and a probe response frame sent from the AP to the STA. The probe request frame includes an indication whether the STA wants to scan multiple antenna beams from the AP. The probe response frame includes a field to identify a total number of antenna beams on which a transmission will be made and a field to identify the beam that is currently being transmitted on.

BRIEF DESCRIPTION OF THE DRAWINGS

A more detailed understanding of the invention may be had from the following description of a preferred embodiment, given by way of example, and to be understood in conjunction with the accompanying drawings, wherein:

FIG. 2 is a diagram of a beacon frame format in accordance with the present invention;

FIG. 5 is a diagram of a probe request frame format in accordance with the present invention;

FIG. 6 is a diagram of a probe response frame format in accordance with the present invention;

DETAILED DESCRIPTION OF THE PREFERRED EMBODIMENTS

Figure 1:
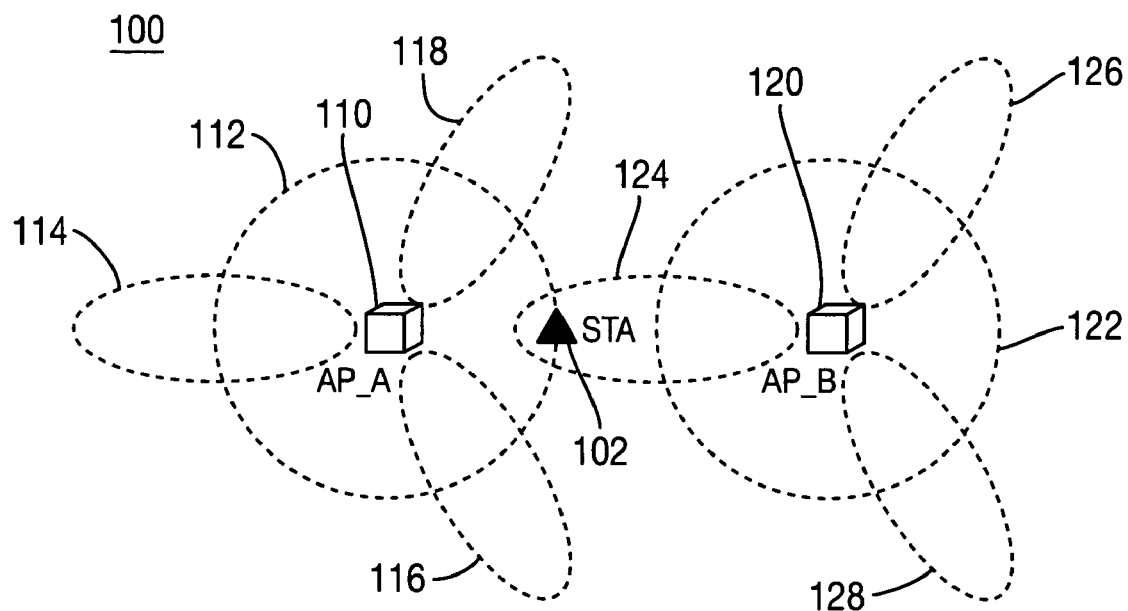
FIG. 1 is a block diagram of a WLAN showing omni-directional and directional antenna beam patterns.

Hereafter, the term "station" (STA) includes, but is not limited to, a wireless transmit/receive unit, a user equipment, a fixed or mobile subscriber unit, a pager, or any other type of device capable of operating in a wireless environment. When referred to hereafter, the term "access point" (AP) includes, but is not limited to, a base station, a Node B, a site controller, or any other type of interfacing device in a wireless environment.

The present invention solves the above problem for both passive scanning and active scanning.

Passive Scanning

The present invention provides the signaling and support for an AP to send its beacon on multiple beams. This can be done by adding two fields to the WLAN beacon management frame, as shown in FIG. 2. The resulting management frame is referred to as an Advanced Antenna (AA) beacon frame 200. Many of the fields of the frame 200 are in the existing beacon frame as defined by the 802.11 standards. These fields include frame control 202, duration 204, destination address (DA) 206, source address (SA) 208, basic service set (BSS) identification (BSSID) 210, sequence control 212, timestamp 214, beacon interval 216, capability information 218, SSID information element (IE) 220, supported rates IE 222, frequency hop (FH)/distribution system (DS) parameter set IE 224, contention free (CF) parameter set IE 226, independent BSS (IBSS) parameter set IE 228, and traffic indication map (TIM) IE 230.

The first new field 232 of the frame 200 indicates to the STA that the beacon frames are sent N times within an AA beacon interval, where N corresponds to the number of beams on which the AP will send the beacon. The second new field 234 identifies the beam that was used to transmit the beacon; i.e., the beam identifier. When receiving any of the multiple AA beacon frames sent by an AP, the STA is able to identify the number of beams (232) included in the beam sweep performed by the AP and it is also able to distinguish the different versions it receives by looking at the beam identifier (234).

It is noted that the AA beacon interval 216 can be set to the same value or different value than the non-AA beacon interval. For the system to be able to offer service to users, the AA beacon interval has to be larger than the beam scan duration, so that there is time left to transmit traffic frames. This could be enforced, for example, as a configuration management rule that would prevent a user from configuring the AP such that the beam scan would take a large portion of the AA beacon interval time.

In a preferred embodiment, the N AA beacon frames 200 are sent successively in time. This is achieved by having the AP use a delay (X) shorter than the DIFS (Distributed Inter-Frame Space) but larger than the SIFS (Short Inter-Frame Space) when trying to access the wireless medium between the transmission of two beacon frames. Any value of X between SIFS and DIFS can be used. It should be noted that the AP would still need to wait for one entire DIFS when accessing the wireless medium to transmit the first of the N beacon frames. This places an upper bound on the maximum amount of time a STA would need to scan the medium once it detected one of the N beacons advertised by an AP; whereby:

$$\text{Upper bound} = (N-1) \times (\text{beacon\_duration} + X) \qquad \text{Equation 1}$$

In other words, this prevents a STA from scanning a channel for an undetermined amount of time without ever knowing if all N beacons have been transmitted by the AP.

Figure 3:
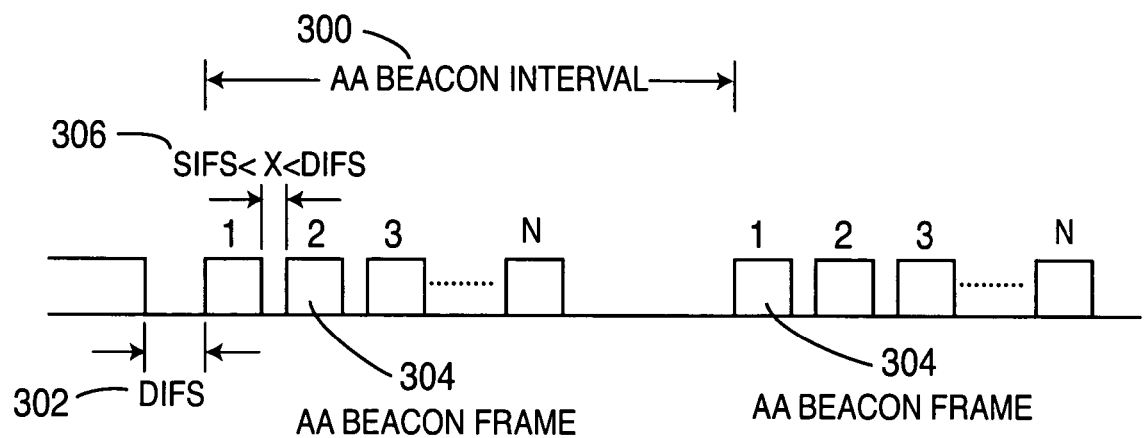
FIG. 3 is a timing diagram for passive scanning in accordance with the present invention.

The timing diagram for the passive scanning is shown in FIG. 3. Before the AP begins the AA beacon interval 300, it waits for one DIFS 302. At the start of the AA beacon interval 300, the AP transmits the first beacon frame 304. In between beacon frames 304, the AP waits for the interval X (306), where X is shorter than the DIFS and larger than the SIFS.

Figure 4:
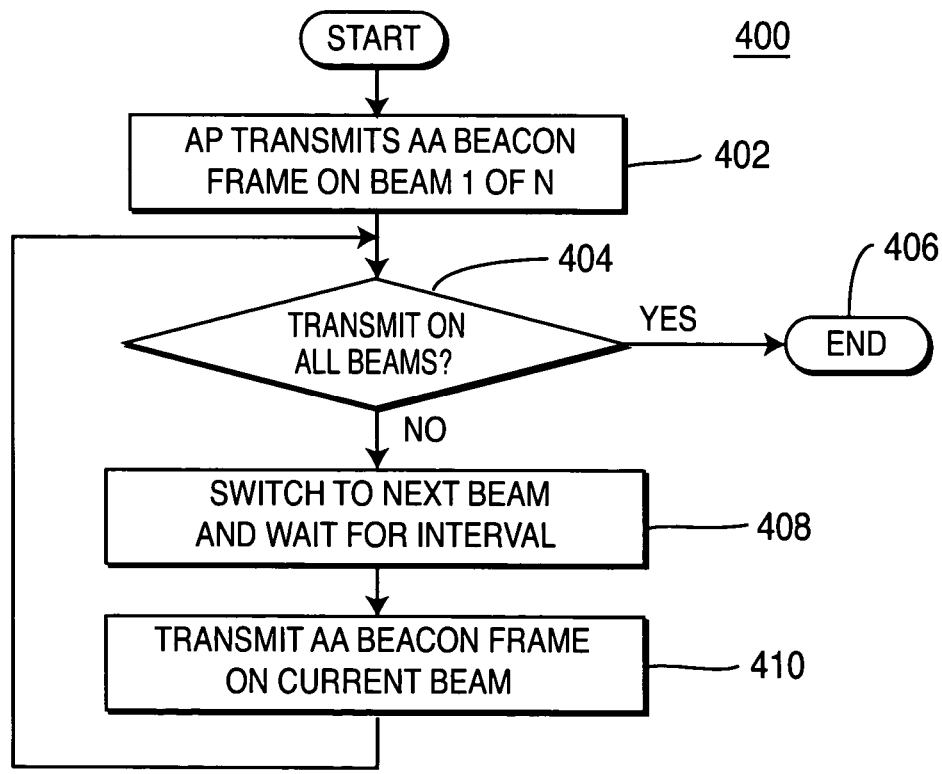
FIG. 4 is a flowchart of a method for transmitting a beacon frame in passive scanning in accordance with the present invention.

A method 400 for transmitting an AA beacon frame in passive scanning is shown in FIG. 4. The method 400 begins with the AP transmitting an AA beacon frame 200 on one of N antenna beams, with the current beam identifier 234 set to the current beam (step 402). A determination is made if the AA beacon frame has been transmitted on all N beams (step 404). If the AA beacon frame has been transmitted on all N beams, then the method terminates (step 406). If the AA beacon frame has not been transmitted on all N beams (step 404), then the method waits for the interval X (step 408). The antenna system then switches to the next beam (step 408) and transmits the AA beacon frame 200 on the current beam, with the current beam identifier 234 set to the current beam (step 410) and the method continues with step 404. It is noted that the step of switching to the next beam (step 408) can be performed either before or after waiting for the interval X.

The determination used by the STA whether to associate to the AP is implementation specific. One method is to use the power level or SNR perceived on the beacons to select the AP to associate to. The present invention allows a STA to use this method while fully capitalizing on the fact that the AP is equipped with an advanced antenna system.

Active Scanning

The present invention also solves the problem for active scanning by allowing a STA to request the AP to send probe responses on multiple beams. This can be done by adding a new field to the WLAN probe request frame. The resulting frame is shown in FIG. 5 and is referred to as an AA probe request frame 500. Many of the fields of the frame 500 are in the existing probe request frame as defined by the 802.11 standards. These fields include frame control 502, duration 504, DA 506, SA 508, BSSID 510, sequence control 512, SSID IE 514, and supported rates IE 516. The new field 518 of the frame 500 provides an indication to the AP (as a yes or no value) that the STA wants to scan all beams of the AP.

In addition, two new fields are added to the WLAN probe response frame. The resulting frame is shown in FIG. 6 and is referred to as an AA probe response frame 600. Many of the fields of the frame 600 are in the existing probe response frame as defined by the 802.11 standards. Fields 602-628 of the frame 600 are the same as fields 202-228 of the frame 200.

The first new field 630 of the frame 600 indicates to the STA that the AA probe responses are sent N times within an AA beacon interval, where N corresponds to the number of beams on which the AP will send the probe response. The second new field 632 identifies the beam that was used to transmit the AA probe response; this is the beam identifier. An AP equipped with an AA system responds to the AA probe request by sending multiple (N) AA probe responses to the STA.

In a preferred embodiment, the N AA probe responses are sent successively in time. This is achieved by having the AP use a delay (X) shorter than the DIFS but larger than the SIFS when trying to access the wireless medium between the transmission of two AA probe responses. It should be noted that the AP would still need to wait for one entire DIFS when accessing the wireless medium to transmit the first of the N probe responses. This places an upper bound on the maximum amount of time a STA would need to wait once it received one of the N AA probe responses sent by an AP; whereby:

$$\text{Upper bound} = (N-1) \times (\text{probe response duration} + X) \qquad \text{Equation 2}$$

Figure 7:
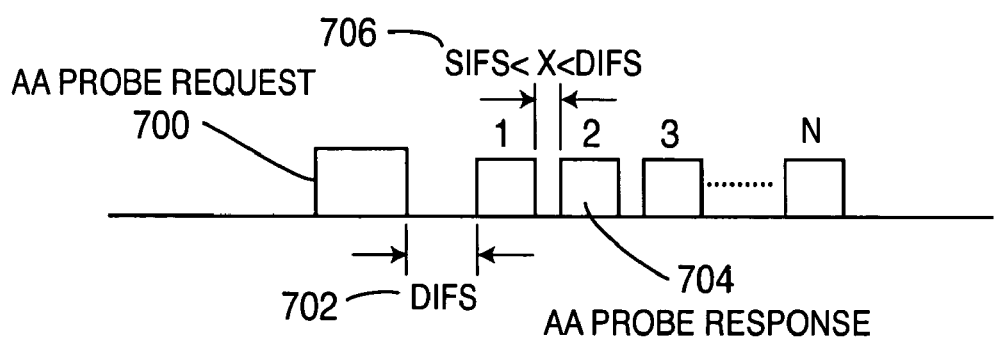
FIG. 7 is a timing diagram for active scanning in accordance with the present invention.

The timing diagram for the active scanning is shown in FIG. 7. After the STA sends the AA probe request frame 700, the AP waits for one DIFS 702 before sending the first AA probe response frame 704. In between probe response frames 704, the AP waits for the interval X (706), where X is shorter than the DIFS and larger than the SIFS.

Figure 8:
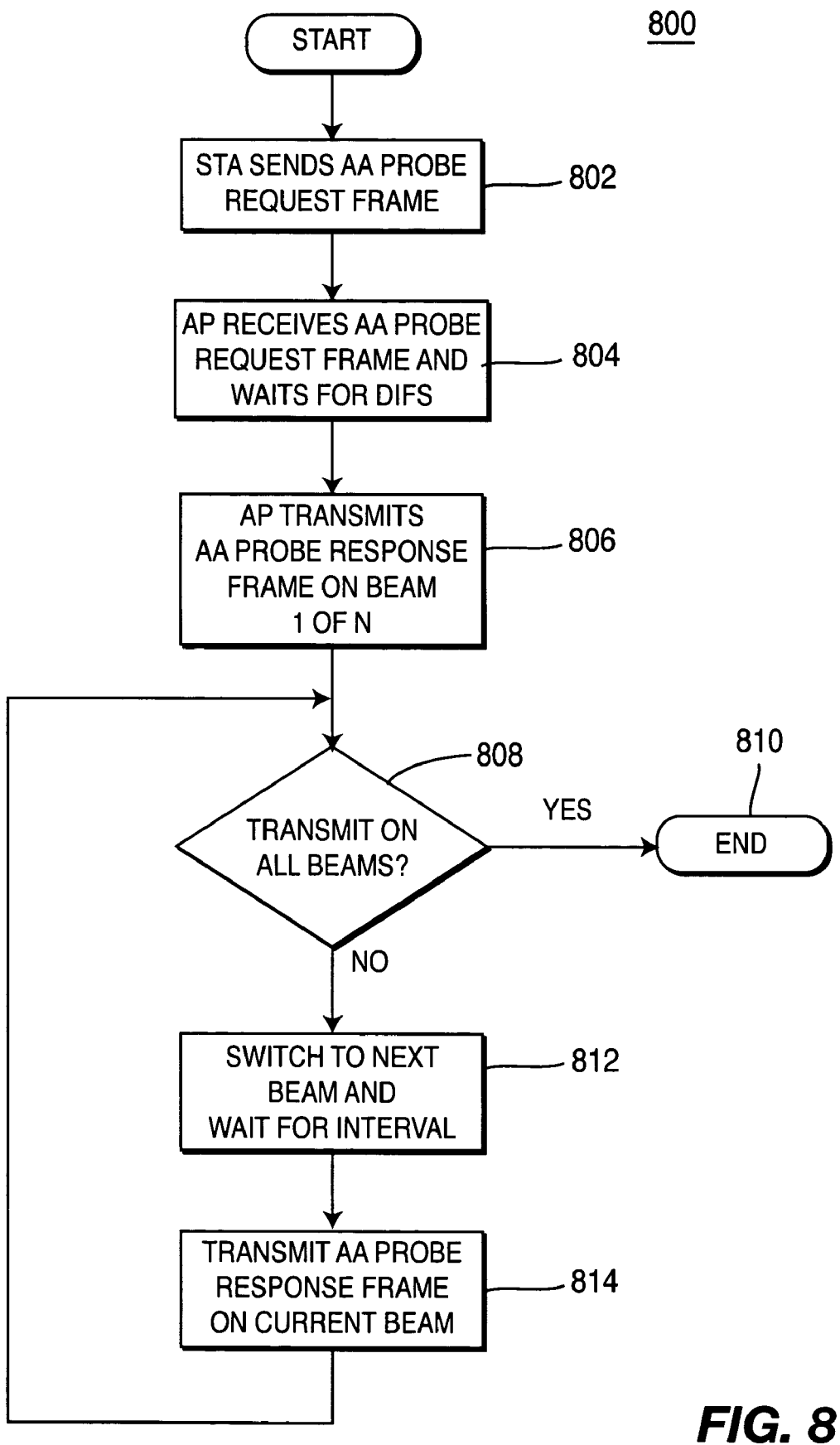
FIG. 8 is a flowchart of a method for transmitting a probe response frame in active scanning in accordance with the present invention.

A method 800 for transmitting an AA probe response frame in active scanning is shown in FIG. 8. The method 800 begins with the STA sending an AA probe request frame 500, including setting the indicator 518 to scan all beams of the AP (step 802). The AP receives the AA probe request frame and waits for the DIFS period (step 804). The AP transmits an AA probe response frame 600 on one of N antenna beams, with the current beam identifier 632 set to the current beam (step 806). A determination is made if the AA probe response frame has been transmitted on all N beams (step 808). If the AA probe response frame has been transmitted on all N beams, then the method terminates (step 810). If the AA probe response frame has not been transmitted on all N beams (step 808), then the method waits for the interval X (step 812). The antenna system then switches to the next beam (step 812) and transmits the AA probe response frame 600 on the current beam, with the current beam identifier 632 set to the current beam (step 814) and the method continues with step 808. It is noted that the step of switching to the next beam (step 812) can be performed either before or after waiting for the interval X.

In prior art systems, the decision made by a STA as to which AP to associate to could not take into account the radio link gain obtained from the advanced antenna structure at the AP. This meant that the data collected from scanning the RF environment, either passively or actively, where the beacon frames and probe responses are sent by APs in an omni-directional fashion, could lead a STA to associate to an AP that would offer worse performance than another AP, had the gains from the AA systems been taken into account.

With the present invention, the data collected by a STA when scanning the RF environment allows it to estimate which AP will be able to provide the best radio link, taking into consideration the gains that the AA systems will offer when traffic frames are transmitted.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for implementing a smart antenna in establishing association in a wireless network, the method comprising:
    (a) transmitting a beacon frame on one antenna beam;
    (b) receiving a response, including a measured signal quality of the beacon frame, from a STA;
    (c) switching to a different antenna beam;
    (d) repeating (a)-(c) until the beacon frame has been transmitted on all antenna beams; and
    (e) associating the STA using the antenna beam with the beacon frame with the highest signal quality.

2. The method according to claim 1, wherein the beacon frame includes a field identifying a total number of antenna beams.

3. The method according to claim 1, wherein the beacon frame includes a field identifying a current antenna beams.

4. The method according to claim 1, wherein the method waits for an interval before transmitting the beacon frame after switching antenna beams.

5. The method according to claim 4, wherein the interval is greater than a short inter-frame space and less than a distributed inter-frame space.

6. A method for implementing a smart antenna in establishing association in a wireless network, comprising the steps of:
    (a) sending a probe request frame, the probe request frame including an indication whether a STA wants to scan multiple beams from an AP;
    (b) receiving a probe response frame, wherein the probe response frame is transmitted by the AP on one antenna beam;
    (c) measuring a signal quality of the probe response frame;
    (d) repeating steps (b)-(c) using a different antenna beam, until the probe response frame has been transmitted on all antenna beams; and
    (g) associating to the AP using the the antenna beam with a highest signal quality.

7. The method according to claim 6, wherein the probe response frame includes a field identifying a total number of antenna beams.

8. The method according to claim 6, wherein the probe response frame includes a field identifying a current antenna beam.

9. The method according to claim 6, wherein the method waits for an interval before transmitting the beacon frame after switching antenna beams.

10. The method according to claim 9, wherein the interval is greater than a short inter-frame space and less than a distributed inter-frame space.

11. A station (STA) for implementing a smart antenna in establishing association in a wireless network, comprising:
    a receiver configured to receive a beacon frame from an access point (AP), said beacon frame including:
        a field to identify a total number of antenna beams on which a transmission will be made; and
        a field to identify the beam that is currently being transmitted on.

12. A station (STA) for implementing a smart antenna in establishing association in a wireless network, comprising:
    a transmitter configured to transmit a probe request frame to an access point (AP), said probe request frame including an indication whether the STA wants to scan multiple antenna beams from the AP; and a receiver configured to receive a probe response frame sent from the AP to the STA, said probe response frame including:
a field to identify a total number of antenna beams on which a transmission will be made; and
a field to identify the beam that is currently being transmitted on.

* * * * *